(12) United States Patent
Kishimoto

(10) Patent No.: US 7,728,862 B2
(45) Date of Patent: Jun. 1, 2010

(54) OPTICAL SCANNING APPARATUS

(75) Inventor: Junichi Kishimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/754,178

(22) Filed: May 25, 2007

(65) Prior Publication Data

US 2007/0285491 A1 Dec. 13, 2007

(30) Foreign Application Priority Data

Jun. 9, 2006 (JP) ............................. 2006-161622

(51) Int. Cl.
*B41J 2/385* (2006.01)
*B41J 2/435* (2006.01)
*B41J 2/45* (2006.01)
*G03G 21/20* (2006.01)

(52) U.S. Cl. .................... 347/236; 347/130; 347/133; 347/238; 347/246; 399/94

(58) Field of Classification Search ................... None
See application file for complete search history.

(56) References Cited

U.S. PATENT DOCUMENTS

| 5,608,747 | A | * | 3/1997 | Baek et al. ..................... 372/33 |
| 5,965,868 | A | * | 10/1999 | Nakamori ..................... 250/205 |
| 6,553,044 | B1 | * | 4/2003 | Eden ........................ 372/38.02 |
| 7,170,536 | B2 | | 1/2007 | Inagawa et al. |
| 2005/0169329 | A1 | * | 8/2005 | Nakatsuka et al. ....... 372/38.02 |

FOREIGN PATENT DOCUMENTS

| CN | 1743894 A | 3/2006 |
| JP | 11-291547 A | 10/1999 |
| JP | 2002-335038 A | 11/2002 |

* cited by examiner

*Primary Examiner*—Matthew Luu
*Assistant Examiner*—Kendrick X Liu
(74) *Attorney, Agent, or Firm*—Canon U.S.A., Inc. I.P. Division

(57) ABSTRACT

An optical scanning apparatus includes a plurality of light sources capable of emitting light. A detection unit detects a light quantity of the light emitted from the plurality of light sources. A control unit controls drive current of a light source designated as a control object based on a detection result obtained by the detection unit. The control unit controls the drive current based on an activation state of the light source designated as the control object and an activation state of a light source other than the control object.

3 Claims, 12 Drawing Sheets

IMAGE DATA FOR TARGET LD

IMAGE DATA FOR NEIGHBORING LD

DRIVING CURRENT

QUANTITY OF LASER BEAM

IMAGE DATA FOR TARGET LD

IMAGE DATA FOR NEIGHBORING LD

DRIVING CURRENT

QUANTITY OF LASER BEAM

IMAGE DATA FOR TARGET LD

IMAGE DATA FOR NEIGHBORING LD

DRIVING CURRENT

QUANTITY OF LASER BEAM

IMAGE DATA

DRIVING CURRENT

QUANTITY OF LASER BEAM

OPTICAL SCANNING APPARATUS

BACKGROUND OF THE INVENTION

1. Field of the Invention

The present invention relates to an optical scanning apparatus including a plurality of light sources that can emit a laser beam based on image data so that an image can be formed on an image carrier with the laser beam.

2. Description of the Related Art

An electrophotographic type image forming apparatus including a laser element capable of functioning as a latent image forming exposure unit is required to have higher capabilities, for example, in resolution and processing speed.

The image forming apparatus drives (on/off controls) a laser element based on image data. In general, the resolution of an image can be improved if the on/off control speed (hereinafter, referred to as "modulation speed") increases although the amount of increase in the modulation speed may be limited.

An image forming apparatus with a laser element emitting a single laser beam is required to excessively increase the modulation speed to attain a requested resolution in a main scanning direction (i.e., the longitudinal direction of an image carrier on which a latent image is formed) as well as in a sub scanning direction (i.e., a rotational direction of the image carrier).

Accordingly, instead of increasing the modulation speed, it is useful to increase the number of laser beams, i.e., the number of light emission points (i.e., light sources), to improve the resolution in the sub scanning direction. For example, if the number of laser beams is increased from 1 to 4, the resolution in the main scanning direction and the sub scanning direction can be doubled at the same modulation speed as the single beam.

The semiconductor lasers (i.e., laser elements) can be classified into two types depending on the direction of light emission. More specifically, an "edge-emitting laser" emits a laser beam in a direction parallel to an active layer. A "surface-emitting laser" or a "vertical-cavity surface-emitting laser (VCSEL)" emits a laser beam in a direction perpendicular to an active layer. In general, an edge-emitting laser is used for an electrophotographic type image forming apparatus.

However, the edge-emitting laser has a technical drawback in that the number of laser beams cannot be increased so much. On the other hand, the surface-emitting laser has a structure easy to increase the number of laser beams because a relatively large number of light sources can be arrayed on a surface.

Therefore, an electrophotographic type image forming apparatus, if it employs a surface-emitting laser capable of simultaneously emitting numerous laser beams, can realize high resolution and high speed processing.

The light quantity of a laser beam emitted from a semiconductor laser (i.e., laser diode (LD)) varies depending on the temperature. More specifically, the temperature of a laser diode increases when light emission from the laser diode continues for a long time. As a result, the light quantity of a laser beam on a photosensitive drum surface (i.e., image carrier) cannot be maintained at a constant level. An image formed on the photosensitive drum includes unevenness or fogging.

To solve this problem, as discussed in Japanese Patent Application Laid-open No. 2002-335038, a conventional light-emitting element driving apparatus depending on a combination of voltage drive and current drive can correct a variation in laser light quantity that occurs due to a temperature rise in a laser diode.

More specifically, the light-emitting element driving apparatus detects a reduction in a terminal voltage of a laser diode due to heat generation in the laser diode, as a temperature rise, in a constant current drive operation. The light-emitting element driving apparatus controls a drive voltage based on a detection value so as to correct a variation in the laser light quantity.

Furthermore, as discussed in Japanese Patent Application Laid-open No. 11-291547, a conventional image forming apparatus corrects droop characteristics which vary depending on image data. According to this image forming apparatus, when light emission of a laser diode is based on a current drive, a drive current corresponding to image data is added to a drive current for an auto power control (APC), i.e., automatic light quantity control. A detailed laser diode driving operation is described below with reference to FIG. 11 and FIGS. 12A through 12C.

FIG. 11 illustrates a laser drive control circuit included in the conventional image forming apparatus. The laser drive control circuit illustrated in FIG. 11 includes a laser diode (LD) 101 and a photo diode (PD) sensor 102 which cooperatively form a laser chip. Furthermore, the laser drive control circuit includes a bias current source 103 for the LD 101 and a pulse current source 104 for the LD 101.

A modulation unit 105 receives an image signal "DATA" and outputs a pixel modulation signal to a switch 106. The switch 106 performs an on/off control based on the pixel modulation signal supplied from the modulation unit 105. Namely, the switch 106 controls the current supplied to the LD 101 from the pulse current source 104. Thus, the LD 101 emits a laser beam based on the pixel modulation signal.

The PD sensor 102 monitors (detects) light emission from the LD 101 and generates an output signal (i.e., detection result) which is sent to a current/voltage (I/V) converter 107. The current/voltage converter 107 converts the output signal of the PD sensor 102 into a voltage signal. An amplifier (Gain) 108 receives the voltage signal from the current/voltage converter 107 and amplifies the received voltage signal. An APC circuit 109 receives the amplified voltage signal from the amplifier 108 and performs a feedback control of an output current amount supplied to the bias current source 103. In other words, the APC circuit 109 equalizes a bias light quantity of the LD 101 with a desired light quantity.

The LD 101 has droop characteristics which depend on an on-period of the LD 101. Even if the drive current amount is controlled to be constant during a scanning operation, the light emission quantity of the LD 101 gradually decreases due to the droop characteristics. Similar phenomenon appears when the drive current control is performed based on a pulse signal. A laser diode having strong droop characteristics tends to cause a large attenuation in the light emission quantity when the on-period of the laser diode is long.

A current control unit 110 outputs a correction signal to a pulse correction current source 111. The correction signal is dependent on the on-period of the LD 101 in a scanning operation. The pulse correction current source 111 supplies current based on the correction signal. Thus, a sum of current values output from the pulse current source 104 and the pulse correction current source 111 is supplied to the LD 101 as a pulse drive current during a scanning operation. Furthermore, a sequence controller 112 is in communication with the APC 109 and the current control unit 110.

FIGS. 12A through 12C illustrate an exemplary change in the light emission quantity of the LD 101 during an on-period, according to the laser drive control circuit which includes the current control unit 110 and the pulse correction current source 111. FIG. 12A illustrates image data being set for light emission from the LD 101. FIG. 12B illustrates drive current flowing across the LD 101. FIG. 12C illustrates the quantity of light emitted from the LD 101.

In FIGS. 12B and 12C, solid lines represent the data measured when the laser drive control circuit includes the current control unit 110 and the pulse correction current source 111. Dotted lines represent the data measured when the laser drive control circuit does not include the current control unit 110 and the pulse correction current source 111.

Namely, if the drive current supplied to the LD 101 is constant as indicated by a dotted line in FIG. 12B, the light emission quantity of the LD 101 during an on-period gradually decreases due to the above-described droop characteristics as indicated by a dotted line in FIG. 12C.

On the other hand, as indicated by a solid line in FIG. 12C, the light emission quantity of the LD 101 during an on-period can be maintained at a constant level when the laser drive control circuit includes the current control unit 110 and the pulse correction current source 111.

As described above, an electrophotographic type image forming apparatus can use a surface-emitting laser capable of emitting numerous laser beams to realize high resolution and high speed processing.

However, the surface-emitting laser includes a plurality of laser diodes (light emission points) disposed densely on the same chip. The self heat generation from one laser diode has significant effects on neighboring laser diodes disposed on the same chip. Therefore, if the conventional light quantity correction is applied to a surface-emitting laser without considering the effects given from the neighboring laser diodes, a target laser diode (i.e., a control object) cannot generate a laser beam whose light quantity is stable during an on-period.

SUMMARY OF THE INVENTION

Exemplary embodiments of the present invention are directed to an optical scanning apparatus capable of realizing a stable light quantity control for a laser diode of a surface-emitting laser. More specifically, an optical scanning apparatus according to an exemplary embodiment can suppress a momentary change in the light quantity occurring due to temperature effects received from neighboring laser diodes.

According to an aspect of the present invention, an optical scanning apparatus includes a plurality of light sources configured to emit light; a detection unit configured to detect a light quantity of the light emitted from the plurality of light sources; and a control unit configured to control drive current of a light source designated as a control object based on a detection result obtained by the detection unit so that the light source designated as the control object emits light having a target light quantity. The control unit controls the drive current based on an activation state of the light source designated as the control object and an activation state of a light source other than the control object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain the principles of the invention.

DETAILED DESCRIPTION OF THE EMBODIMENTS

Figure 1:
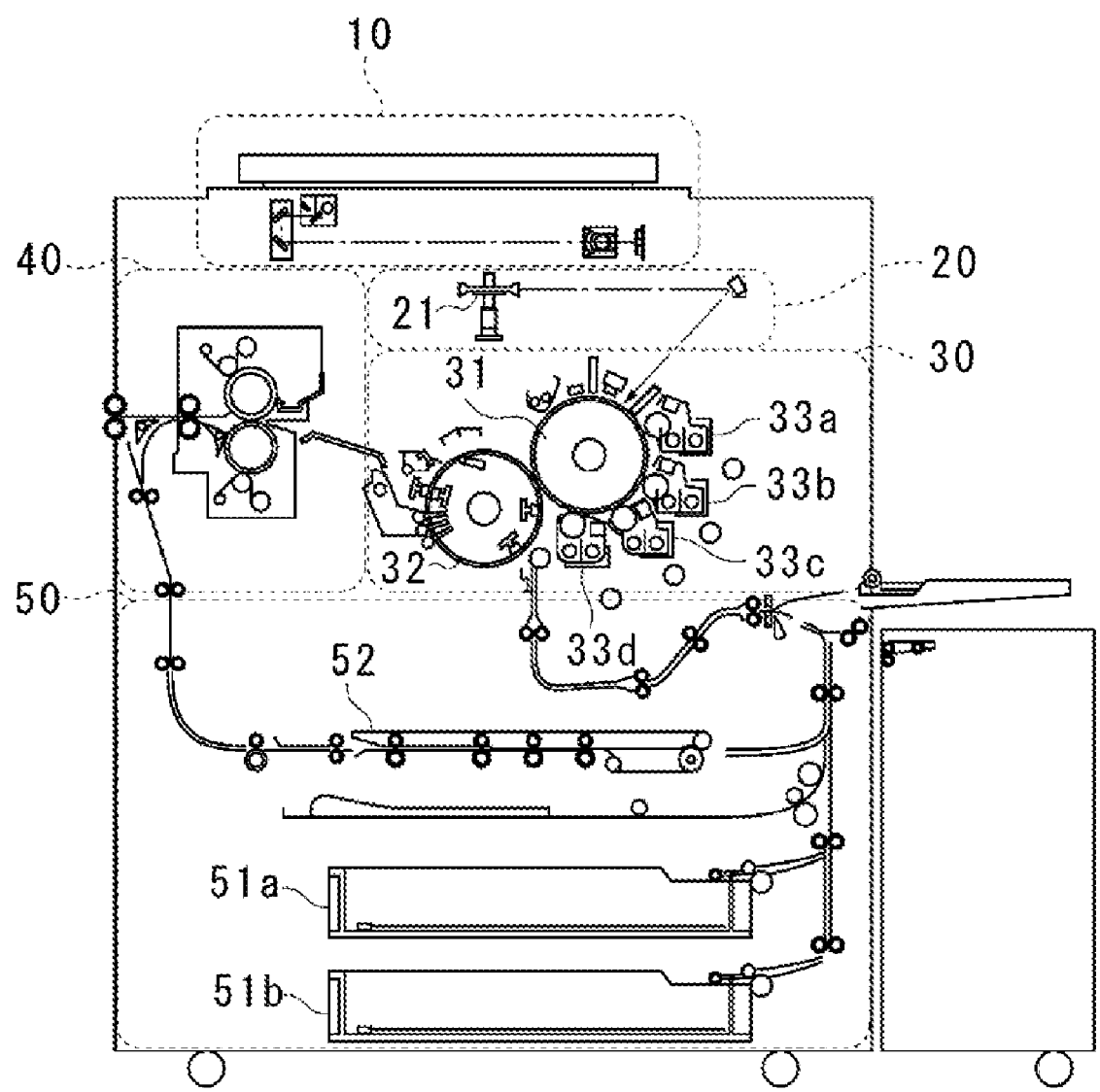
FIG. 1 is a vertical cross-sectional view illustrating an example arrangement of an image forming apparatus according to an exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is described in one figure, it may not be discussed for following figures.

Exemplary embodiments, features and aspects of the present invention will now herein be described in detail below with reference to the drawings.

First Exemplary Embodiment

FIG. 1 is a vertical cross-sectional view illustrating an exemplary arrangement of an image forming apparatus according to an exemplary embodiment of the present invention. The image forming apparatus is, for example, a one-drum (1D) color multi-function peripheral (MFP) which includes a single photosensitive drum.

The 1D color MFP includes a scanner unit 10, a laser exposure unit 20, an image forming unit 30, a fixing unit 40, and a sheet feeding/conveyance unit 50, which are controlled by a printer control unit (not illustrated).

The scanner unit 10 optically reads an image of a document which is placed on a platen glass and illuminated by a light source, and converts the read image into electric signals to generate image data.

The laser exposure unit 20 modulates a laser beam based on the image data sent from the scanner unit 10, and emits the laser beam toward a polygon mirror 21 rotating at a constant angular speed. The polygon mirror 21 reflects the laser beam so that the laser beam travels, as scanning light, toward a photosensitive drum (image carrier) 31 in the image forming unit 30.

The image forming unit 30 performs the following sequential electrophotographic processing for forming an image. First, the image forming unit 30 rotates and electrifies a photosensitive drum 31 and develops, with toners, a latent image on the photosensitive drum 31 formed by the laser exposure unit 20. Then, the image forming unit 30 transfers toner images onto a sheet wound around a transfer drum 32. Finally, the image forming unit 30 collects residual toners (i.e., toners not transferred and remaining) on the photosensitive drum 31.

A total of four developing units 33a through 33d, respectively storing yellow (Y), cyan (C), magenta (M), and black (K) toners, are sequentially disposed along the photosensitive drum 31. A sheet wound around the transfer drum 32 is positioned at a predetermined position on the transfer drum 32. The photosensitive drum 31 and the transfer drum 32 make four complete revolutions to enable the developing units 33a through 33d to successively execute the above-described electrophotographic processing. As a result, a full-color (i.e., 4-color) toner image can be transferred onto the sheet at the timing the drums 31 and 32 have made the four complete revolutions. The sheet is conveyed from the transfer drum 32 to the fixing unit 40.

The fixing unit 40, arranged by a combination of rollers and belts, includes a built-in halogen heater or a comparable heating device that can apply heat and pressure to the toners transferred on the sheet to fix the toner images formed by the image forming unit 30.

The sheet feeding/conveyance unit 50, including sheet containers 51a and 51b (e.g., sheet cassettes or paper decks), separates and picks one sheet up from the sheet containers 51a and 51b in response to a command supplied from the printer control unit and conveys the picked-up sheet to the image forming unit 30. In the image forming unit 30, a sheet wound around the transfer drum 32 rotates and toner images of YMCK colors are transferred onto the sheet while the drums 31 and 32 make the above-described four complete revolutions.

The sheet on which the toner images are transferred is then conveyed to the fixing unit 40. If the image forming unit 30 forms two-sided images on front and back surfaces of a sheet, the sheet output from the fixing unit 40 is conveyed along a carrying path 52 and input again into the image forming unit 30.

The printer control unit (not illustrated) communicates with a MFP control unit (not illustrated) that performs an overall control for the MFP and executes a predetermined control based on a command supplied from the MFP control unit.

The printer control unit manages the operating state of the above-described scanner unit 10, the laser exposure unit 20, the image forming unit 30, the fixing unit 40, and the sheet feeding/conveyance unit 50, and generates a command so that the image forming apparatus can effectively operate as a whole.

Figure 2:
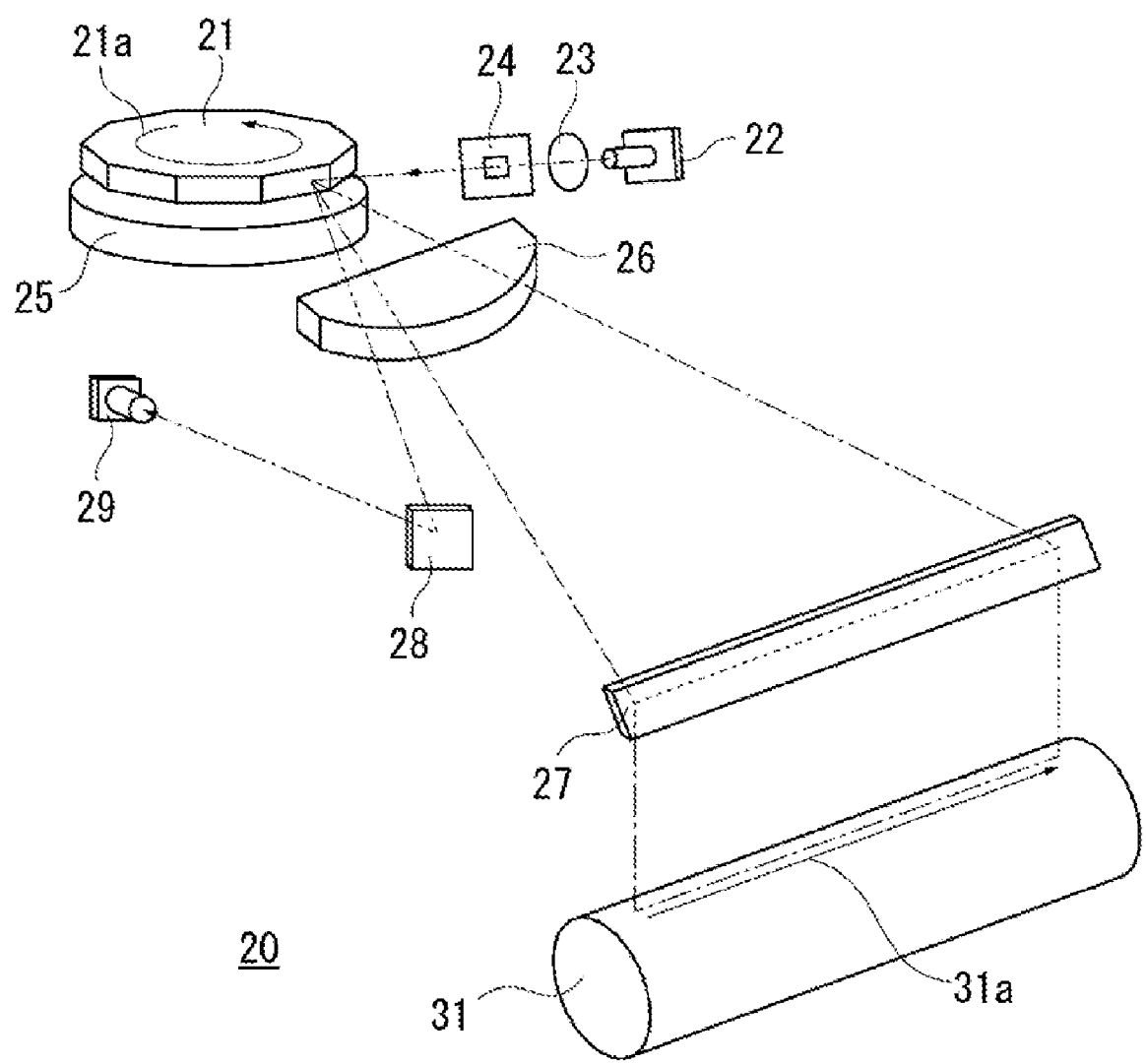
FIG. 2 is a perspective view illustrating an example arrangement of a laser exposure unit according to an exemplary embodiment.

FIG. 2 is a perspective view illustrating an exemplary arrangement of the laser exposure unit 20. A collimator lens 23 and a diaphragm 24 convert a laser beam emitted from a semiconductor laser 22 into a parallel beam having a predetermined beam diameter that travels toward a polygon mirror 21.

The polygon mirror 21, driven by a polygon motor 25, rotates at a constant angular speed in a direction indicated by an arrow 21a. The polygon mirror 21 can change incident light into a deflection beam that can continuously change the angle according to the rotation of the polygon mirror 21. An f-θ (f-theta) lens 26 has a beam-condensing function for condensing the deflection beam.

The f-θ lens 26 has a distortion aberration correcting function for assuring temporal linearity of a scanning operation. A chevron-shaped mirror 27 reflects the light having passed through the f-θ lens 26. Thus, the laser exposure unit 20 can form an image of the light on the photosensitive drum 31 while it performs a constant-speed scanning operation in a direction indicated by an arrow 31a.

While the laser exposure unit 20 executes the above-described operation, a beam detection (BD) sensor 29 receives, via a BD mirror 28, part of the light reflected by the polygon mirror 21. The BD sensor 29 outputs a detection signal which can be used as a sync signal. The image forming apparatus can synchronize write timing of image data with the rotation of the polygon mirror 21 based on the sync signal.

Figure 3:
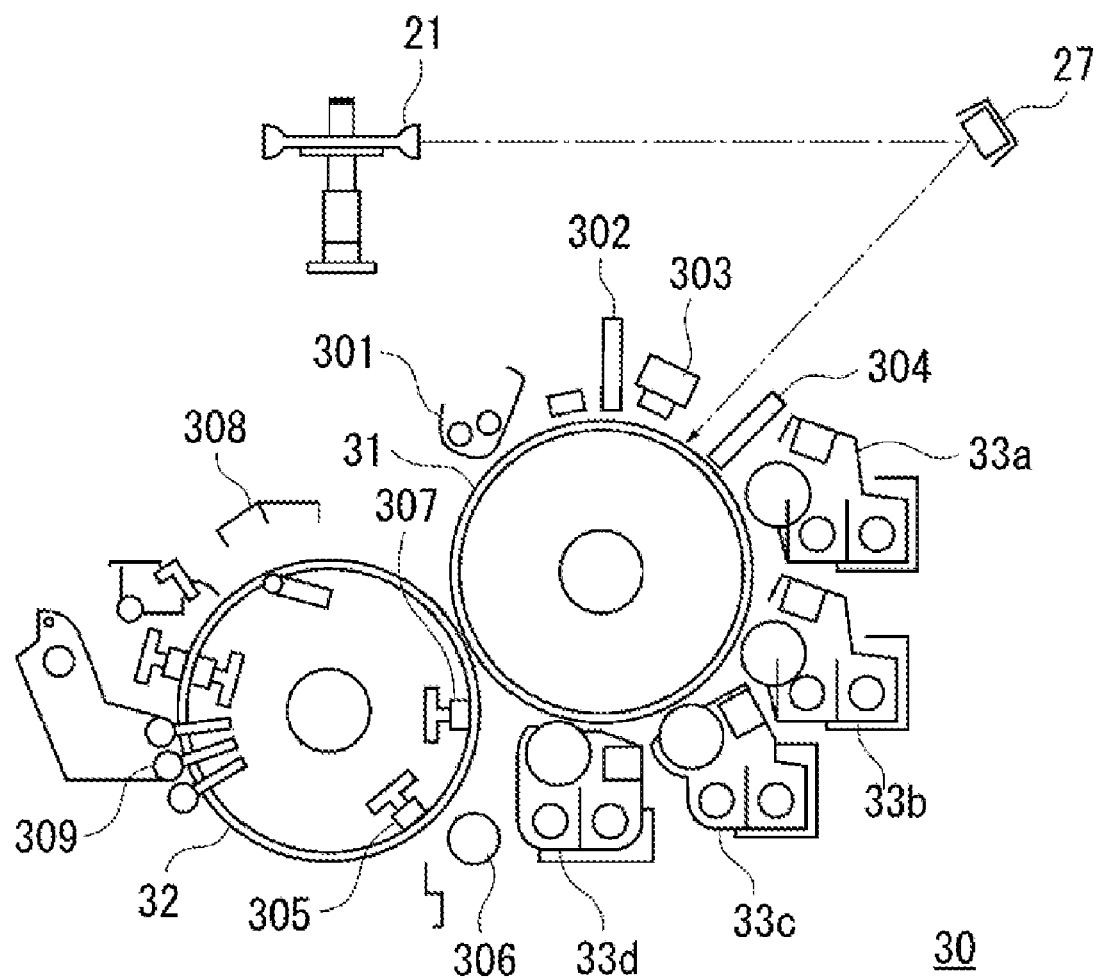
FIG. 3 is a cross-sectional view illustrating an example detailed arrangement of an image forming unit that includes a single photosensitive drum to form a color image.

FIG. 3 is a cross-sectional view illustrating a detailed arrangement of the image forming unit 30 that includes a single photosensitive drum 31 capable of forming a color image.

A cleaner unit 301 collects toners residing or adhering on the photosensitive drum 31 and cleans the surface of the photosensitive drum 31. A pre-exposure LED 302 erases residual charges on the surface of the photosensitive drum 31.

A primary charging device 303 includes a discharge apparatus which may be referred to as "grid." The primary charging device 303 maintains the surface of the photosensitive drum 31 at a predetermined electrical potential.

A potential sensor 304 measures a surface potential of the photosensitive drum 31. In particular, the potential sensor 304 can measure an electric potential (Vl) of an exposed portion which is irradiated with a laser beam and a primary electrify potential (Vd) of a non-exposed portion.

In response to a power-on operation, or at the timing immediately after print processing for a predetermined number of sheets is completed, the image forming apparatus can adjust the light quantity of a laser beam, an electrifying bias, and a developing bias based on a measurement value of the potential sensor 304 that measures the surface potential.

The developing units 33a through 33d successively form toner images of yellow (Y), cyan (C), magenta (M), and black (K) in this order on the surface of the photosensitive drum 31. First, the developing unit 33a approaches closely to the photosensitive drum 31 at designated timing and forms a toner image of yellow (Y) on the surface of the photosensitive drum 31. Meanwhile, the image forming unit 30 performs sheet feeding/conveyance processing at predetermined timing. An attaching charging device 305 and an associated counter roller 306 cooperatively place a sheet on the transfer drum 32. A transfer charging device 307 has an electrostatic function for transferring the toner image of yellow (Y) from the surface of the photosensitive drum 31 to the sheet attached on the transfer drum 32.

Next, the developing unit 33b approaches closely to the photosensitive drum 31 at designated timing and forms a toner image of cyan (C) on the surface of the photosensitive drum 31. Then, the transfer charging device 307 transfers the toner image of cyan (C) from the surface of the photosensitive drum 31 to the sheet attached on the transfer drum 32. Subsequently, the image forming unit 30 forms and transfers the toner images of magenta (M) and black (K) in the same manner.

When the above-described successive transfer processing for the YCMK toner images is finished, a detaching charging device 308 separates the sheet from the transfer drum 32 and sends the sheet to the fixing unit 40 (refer to FIG. 1). The fixing unit 40 performs predetermined pressurizing/heating processing to fix the toner images on the sheet and outputs the processed sheet to a tray (not illustrated) provided on an outer surface of the apparatus body. A fur brush 309 removes dirties on the transfer drum 32 before the image forming apparatus starts the next job.

Next, a laser drive control apparatus capable of driving the semiconductor laser 22 illustrated in FIG. 2 will be described. First, a surface-emitting laser included in the semiconductor laser 22 will be described.

Figure 4:
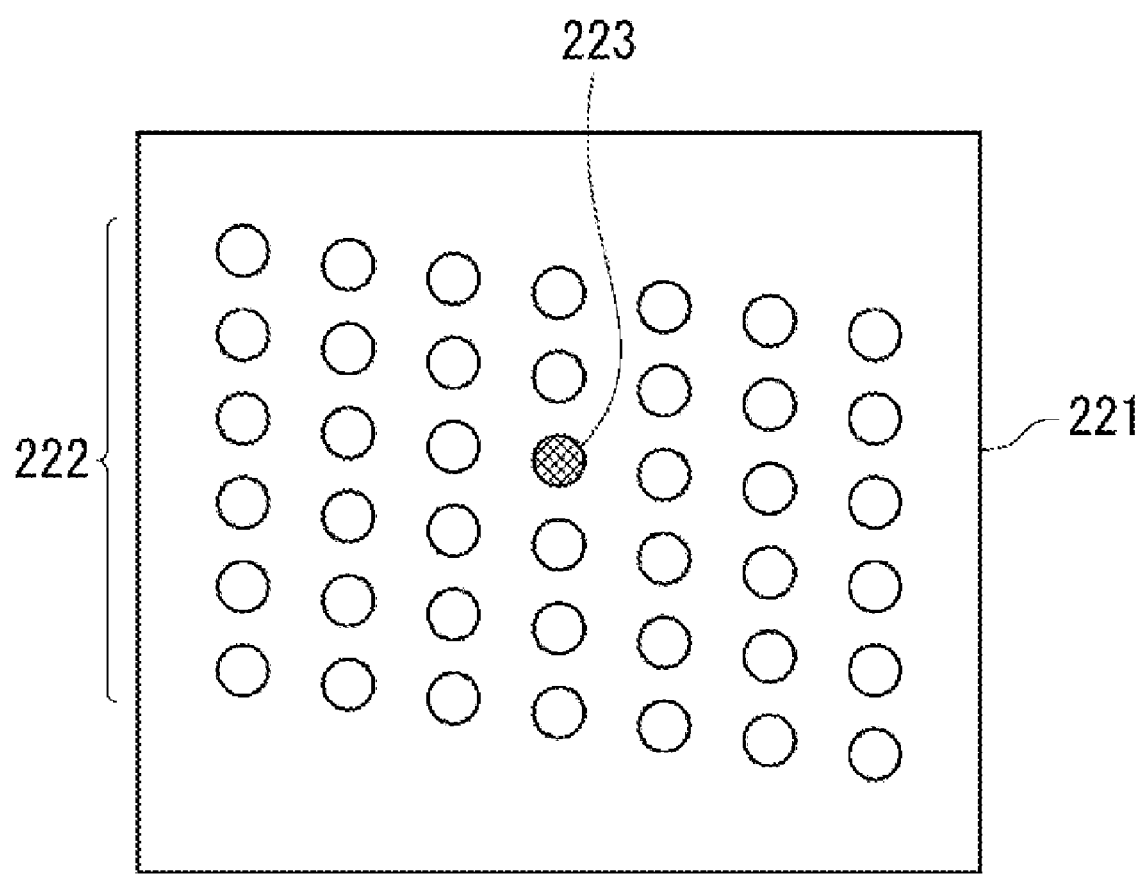
FIG. 4 is a plan view illustrating an example arrangement of a surface-emitting laser included in a semiconductor laser.

FIG. 4 is a plan view illustrating an exemplary arrangement of a surface-emitting laser included in the semiconductor laser 22 which includes a plurality of laser diodes (i.e., light sources) 222 disposed on a laser chip 221. The surface-emitting laser selectively drives at least one of the plurality of laser diodes 222 or drives all the laser diodes 222 simultaneously to emit the laser beam to form an electrostatic latent image on the photosensitive drum 31.

For example, when a laser diode 223 is activated as a control object light source, the laser diode 223 generates a significant amount of heat. The generated heat is transferred via the laser chip 221 to neighboring laser diodes (i.e., light sources other than the control object). This phenomenon is referred to as "temperature crosstalk" which has temperature effects on the neighboring laser diodes.

Therefore, if the laser drive control circuit of the image forming apparatus discussed in the above-described Japanese Patent Application Laid-open No. 11-291547 is employed for a surface-emitting laser, the laser drive control circuit cannot correct the temperature crosstalk.

More specifically, the laser drive control circuit discussed in the above-described Japanese Patent Application Laid-open No. 11-291547 is only effective to correct droop characteristics of each laser diode 222 and is not usable for correcting the temperature crosstalk received from other laser diodes.

FIGS. 5A through 5D illustrate exemplary light emission from the laser diode 223 of the surface-emitting laser which is activated by the above-described laser drive control circuit discussed in the Japanese Patent Application Laid-open No. 11-291547.

Figure 5A:
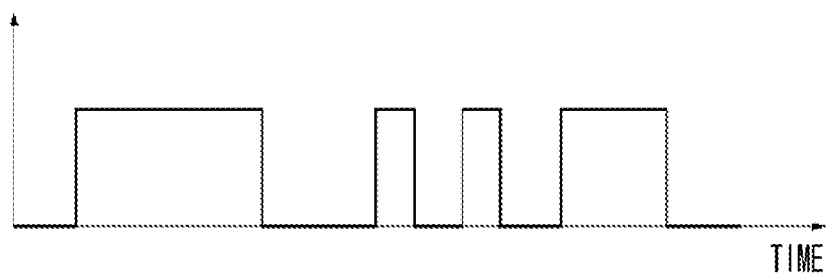
FIGS. 5A through 5D illustrate exemplary light emission from a target laser diode of a surface-emitting laser which is activated by a laser drive control circuit.
Figure 5B:
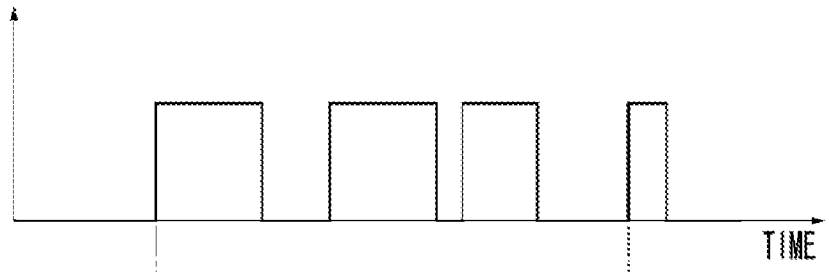
Figure 5C:
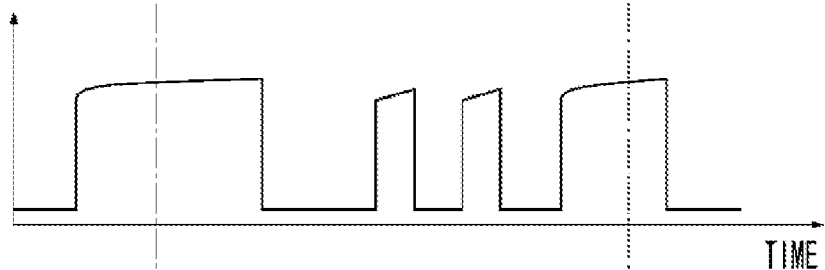
Figure 5D:
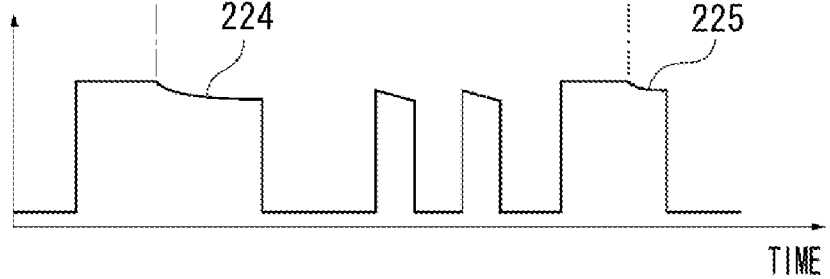
Figure 12A:
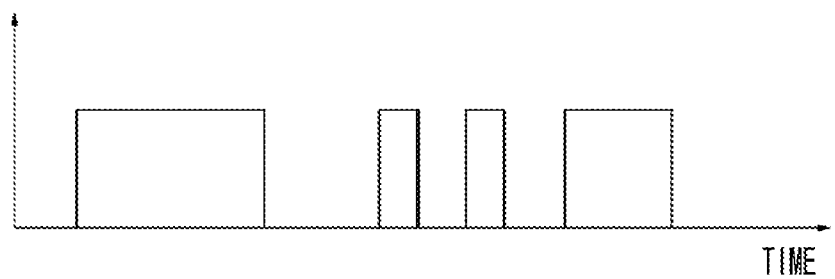
FIGS. 12A through 12C illustrate an exemplary change in the light emission quantity of a laser diode during a on-period when a current control unit and a pulse correction current source are provided.
Figure 12B:
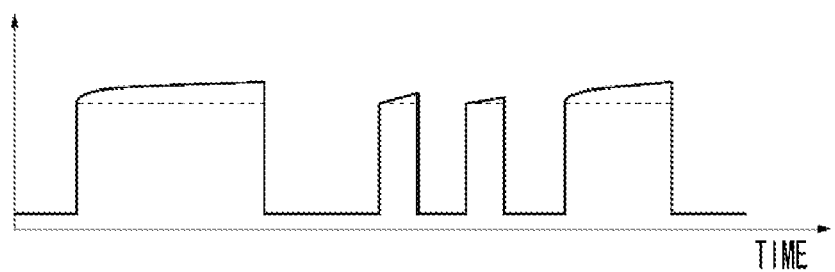
Figure 12C:
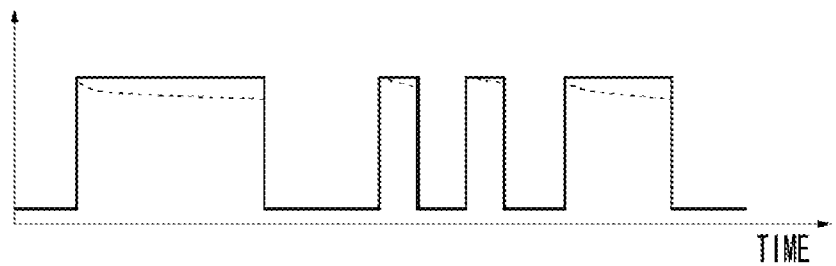

FIG. 5A illustrates image data being set for light emission from the laser diode 223, which is similar to the image data illustrated in FIG. 12A. FIG. 5B illustrates image data being set for light emission from a neighboring laser diode of the laser diode 223. FIG. 5C illustrates drive current flowing across the laser diode 223, which is similar to the drive current illustrated in FIG. 12B. FIG. 5D illustrates the quantity of light emitted from the laser diode 223.

As illustrated in FIG. 5D, the light emission quantity of the laser diode 223 includes light quantity attenuations 224 and 225 due to the temperature crosstalk from neighboring laser diodes of the laser diode 223. Thus, the laser diode 223 cannot maintain the light emission quantity at a constant level.

On the other hand, the laser drive control apparatus according to the first exemplary embodiment can eliminate the above-described light quantity attenuations 224 and 225.

Figure 6:
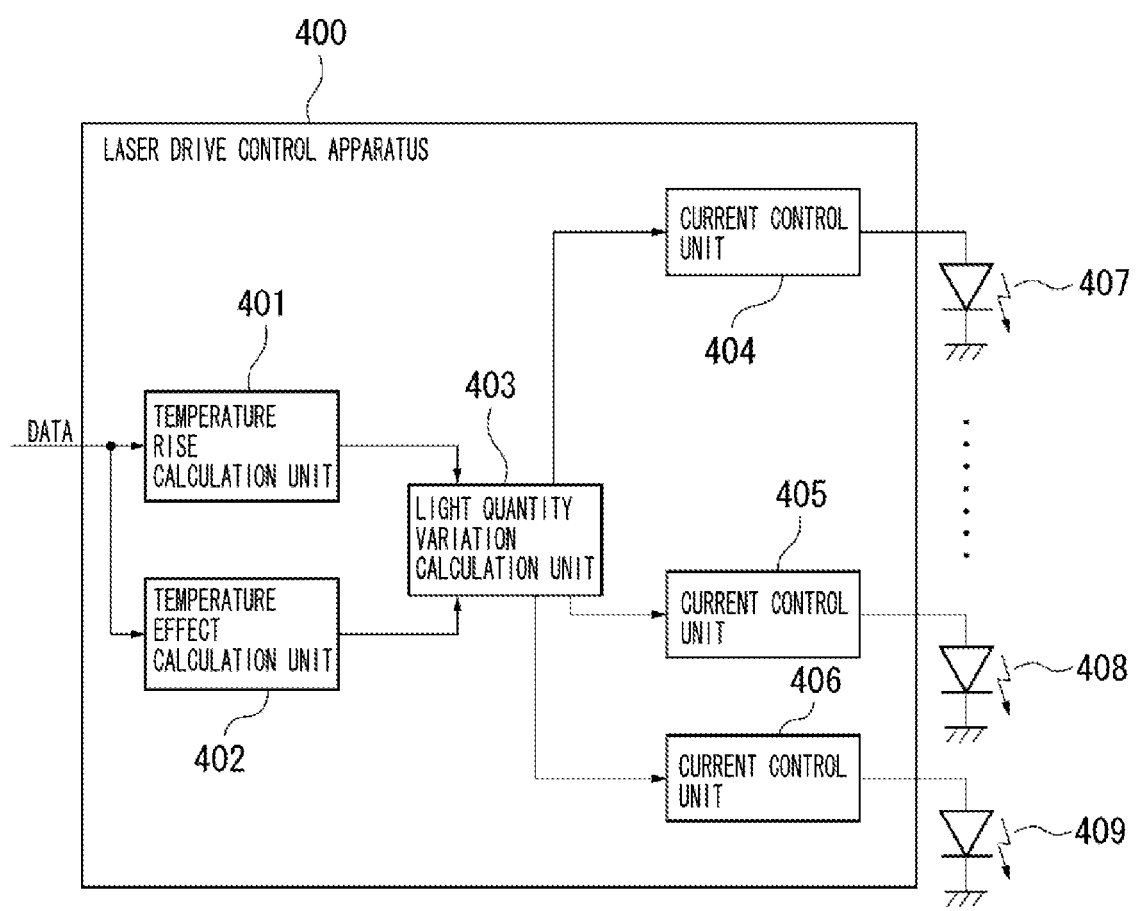
FIG. 6 is a block diagram illustrating an exemplary arrangement of a laser drive control apparatus capable of driving a semiconductor laser according to the first exemplary embodiment.

FIG. 6 is a block diagram illustrating a functional arrangement of a laser drive control apparatus 400 capable of driving the semiconductor laser 22 according to the first exemplary embodiment.

The laser drive control apparatus 400 includes a central processing unit (CPU), a read only memory (ROM) storing a control program executed by the CPU, and a random access memory (RAM) used by the CPU for calculations. Furthermore, the laser drive control apparatus 400 includes an input/output device or the like. The CPU, when executing the above-described control program, can operate as each functional block illustrated in FIG. 6.

The laser drive control apparatus 400 includes a temperature rise calculation unit (i.e., self temperature rise determination unit) 401, a temperature effect calculation unit (i.e., temperature effect determination unit) 402, a light quantity variation calculation unit (i.e., temperature rise determination unit, light quantity attenuation determination unit) 403, and a plurality of current control units (i.e., drive current control units) 404 through 406. Each of the current control units 404 through 406 controls drive current supplied to respective laser diodes 407 through 409 which constitute the surface-emitting laser of the semiconductor laser 22. The laser diodes 407 through 409 correspond to the laser diodes 222 illustrated in FIG. 4.

First, the laser drive control apparatus 400 determines a turn-on period and a turn-off period of respective laser diodes 407 through 409 based on image data of a processing object. Next, the temperature rise calculation unit 401 calculates a self temperature rise in a time sequential manner based on a turn-on period (i.e., an activation state) of each laser diode (i.e., a control target light source).

The temperature effect calculation unit 402 calculates a temperature effect given to a neighboring laser diode (i.e., a light source other than control target) which derives from self heat generation of each laser diode, based on the turn-on period of each laser diode (i.e., the activation state of the light source), in a time sequential manner (i.e., based on the activation state of the light source).

Next, the light quantity variation calculation unit 403 calculates a temperature rise curve (time sequential temperature rise) resulting from light emission in each laser diode, based on the calculation results in the above-described calculations. The temperature rise curve includes a temperature crosstalk from any neighboring laser diode.

The light quantity variation calculation unit 403 calculates a light quantity attenuation curve in each laser diode (i.e., time sequential light quantity attenuation) based on the temperature rise curve, and calculates a drive current variation curve in each laser diode (i.e., time sequential drive current change amount) based on the light quantity attenuation curve.

The light quantity variation calculation unit 403 calculates the drive current variation curve so that the light emission quantity in each laser diode remains constant in an on-period.

The current control units 404 through 406 perform processing for time sequentially increasing/decreasing the drive current to be supplied to a corresponding laser diode based on a drive current variation curve of the corresponding laser diode. With this processing, the laser diodes 407 through 409 can emit light having a constant emission quantity during an on-period.

The ROM according to the present embodiment stores a lookup table of data representing a relationship between the turn-on period of each laser diode and a time sequential self temperature rise. Furthermore, the ROM stores a lookup table of data representing a relationship between the turn-on period of each laser diode and a time sequential temperature effect given to a neighboring laser diode due to self heat generation by each laser diode.

Furthermore, the ROM can store data representing a time sequential temperature rise of each laser diode corresponding to the above-described self temperature rise and the temperature effect, data representing a time sequential light quantity attenuation corresponding to the temperature rise in each laser diode, and data representing a time sequential drive current change amount corresponding to the light quantity attenuation in each laser diode.

The temperature rise calculation unit 401, the temperature effect calculation unit 402, and the light quantity variation calculation unit 403 can refer to these lookup tables to obtain the results similar to those obtained by the calculations.

It is noted that an exemplary embodiment of the present invention may use equations of approximation instead of using the lookup tables.

Figure 11:
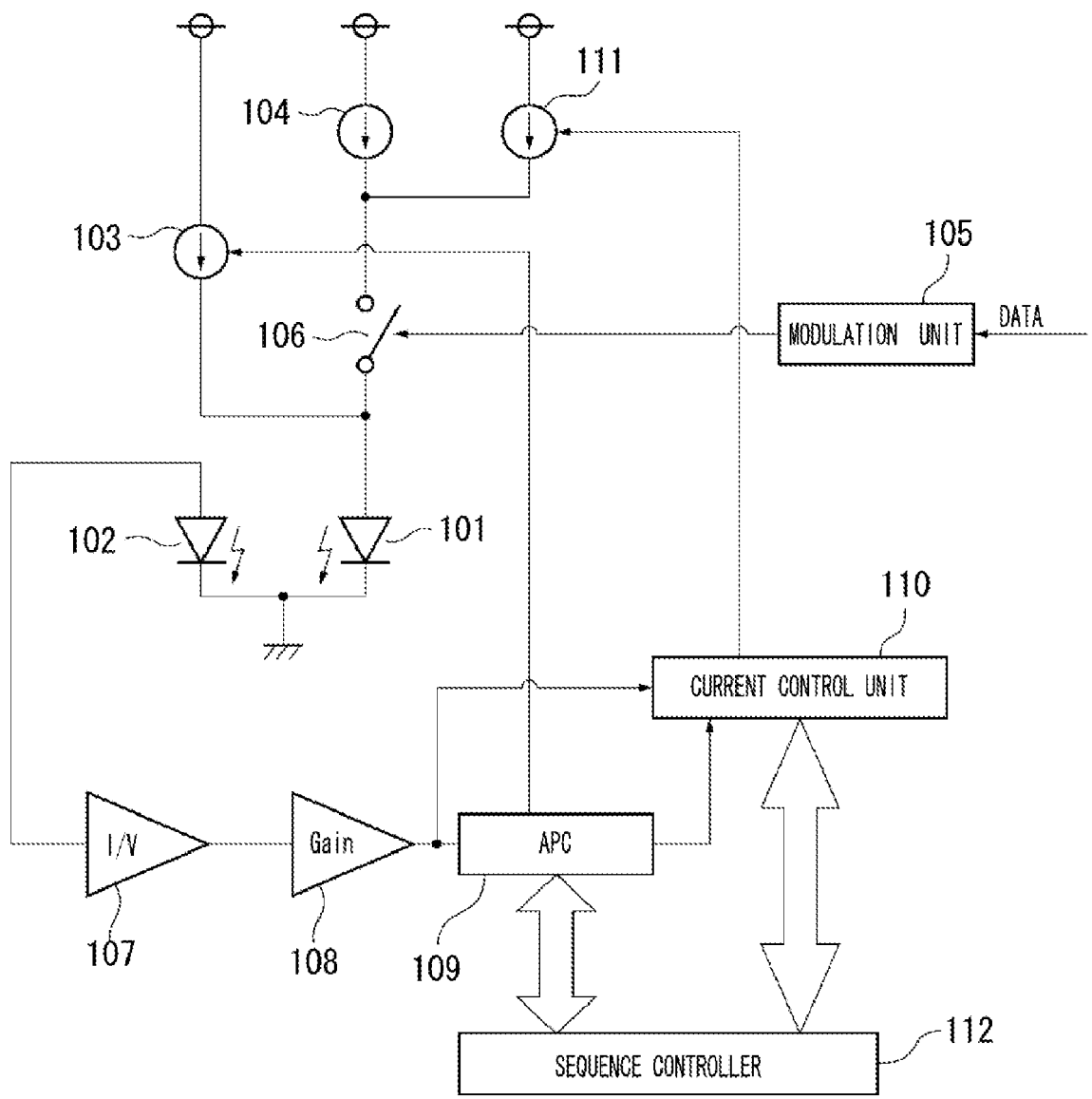
FIG. 11 illustrates a laser drive control circuit included in a conventional image forming apparatus.

The auto power control (APC) performed in the first exemplary embodiment is similar to the conventional auto power control (APC) illustrated in FIG. 11.

FIGS. 7A through 7D illustrate exemplary light emission from the laser diode 223 of the surface-emitting laser which is activated by the laser drive control apparatus 400.

Figure 7A:
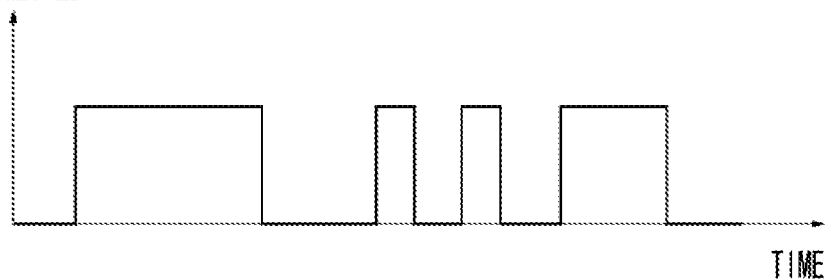
FIGS. 7A through 7D illustrate exemplary light emission from a target laser diode of a surface-emitting laser which is activated by the laser drive control apparatus according to the first exemplary embodiment.
Figure 7B:
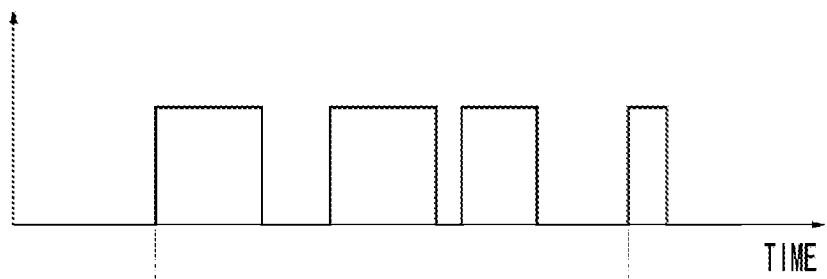
Figure 7C:
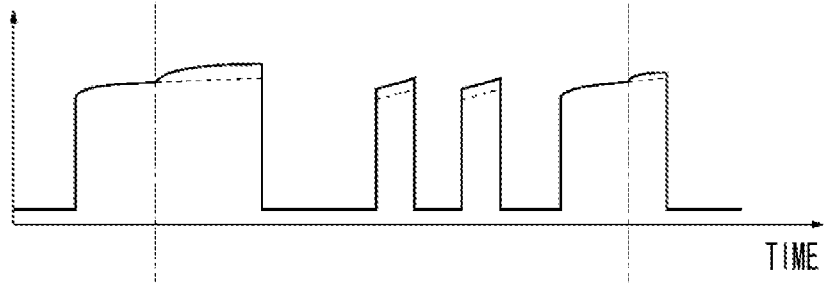
Figure 7D:
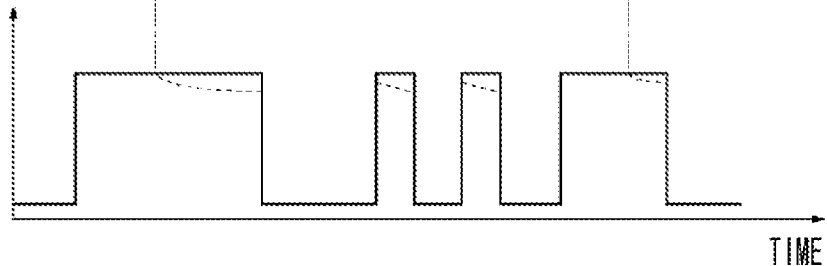

FIG. 7A illustrates image data being set for light emission from the laser diode 223, which is similar to the image data illustrated in FIG. 5A. FIG. 7B illustrates image data being set for light emission from a neighboring laser diode of the laser diode 223, which is similar to the image data illustrated in FIG. 5B. FIG. 7C illustrates drive current flowing across the laser diode 223 (refer to a solid line), wherein a dotted line represents the drive current illustrated in FIG. 5C. FIG. 7D illustrates the quantity of light emitted from the laser diode 223 (refer to a solid line), wherein a dotted line represents the light emission quantity illustrated in FIG. 5D.

As understood from FIG. 7C, if the laser drive control apparatus illustrated in FIG. 6 is used to activate each laser diode of a surface-emitting laser, the drive current of each laser diode increases by an amount corresponding to the temperature crosstalk received from neighboring laser diodes.

Accordingly, as understood from FIG. 7D, each laser diode can emit a laser beam whose light quality is stable during an on-period because the laser drive control apparatus illustrated in FIG. 6 can correct the temperature crosstalk received from the neighboring laser diodes.

As described above, the first exemplary embodiment performs real-time processing for correcting the temperature crosstalk received from neighboring laser diodes. Furthermore, the first exemplary embodiment calculates a drive current amount in a time sequential manner based on image data, so that the light emission quantity of each laser diode can be maintained at a constant level during the on-period, and supplies the calculated drive current to each laser diode.

The first exemplary embodiment can eliminate any change in the light quantity occurring due to temperature effects received from neighboring light-emitting elements and, as a result, can realize a stable light quantity control. Namely, the first exemplary embodiment can flexibly correct any change in the light quantity when each light-emitting element of the surface-emitting laser is subjected to temperature effects (including self temperature rise) while adjusting the light quantity during a scanning operation. Thus, the present embodiment can realize a stable real-time light quantity control. As a result, the image forming apparatus according to the first exemplary embodiment can form an accurate image.

Second Exemplary Embodiment

Next, a second exemplary embodiment of the present invention will be described. The second exemplary embodiment is similar to the first exemplary embodiment in arrangement. In the following description, components or portions of the second exemplary embodiment identical or similar to those described in the first exemplary embodiment are denoted by the same reference numerals. The following description is directed to the portions not described in the first exemplary embodiment.

Figure 8:
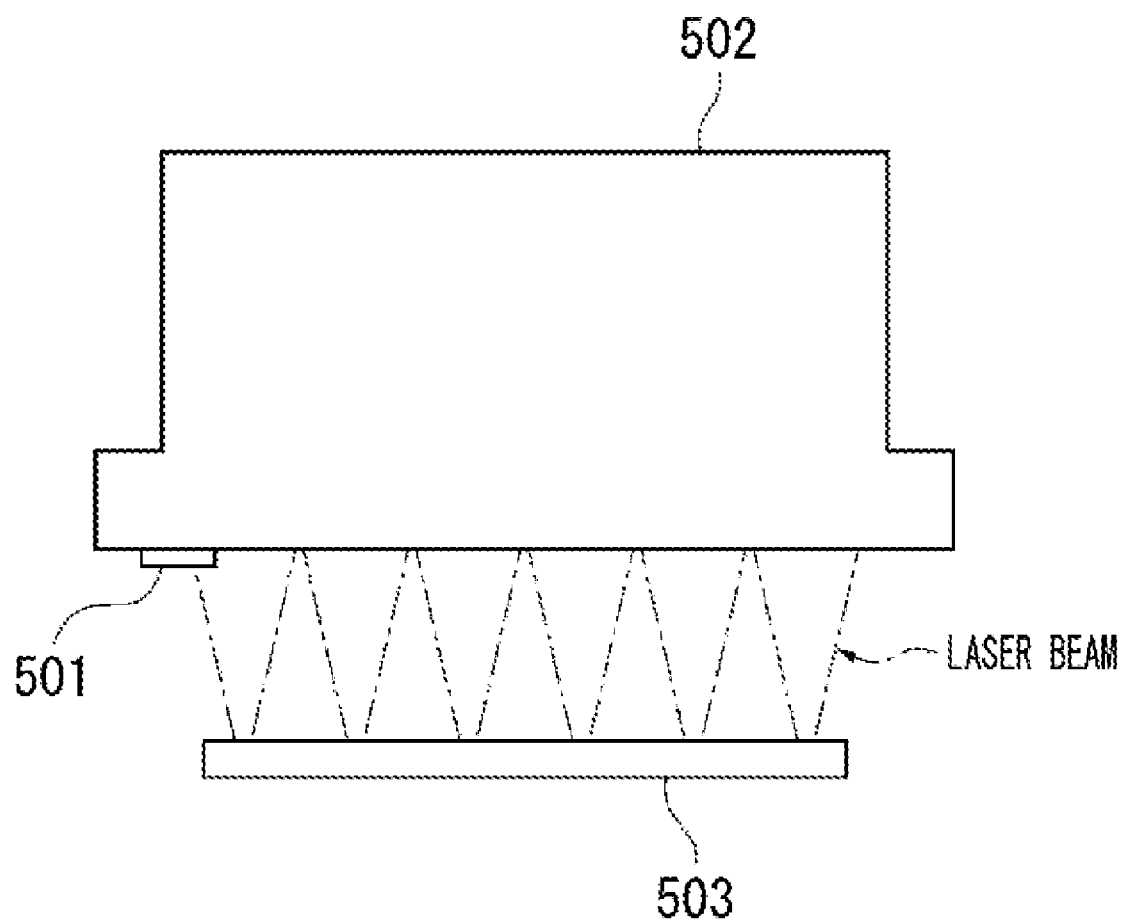
FIG. 8 illustrates an example arrangement of a surface-emitting laser and a laser lens barrel according to a second exemplary embodiment.

FIG. 8 illustrates a surface-emitting laser 503 and a laser lens barrel 502 according to the second exemplary embodiment. A light quantity sensor 501 detects the light quantity of a laser beam emitted from a specific laser diode included in the surface-emitting laser 503. The light quantity sensor 501, provided in the laser lens barrel 502, can detect the light quantity of shading light of the laser beam.

Figure 9:
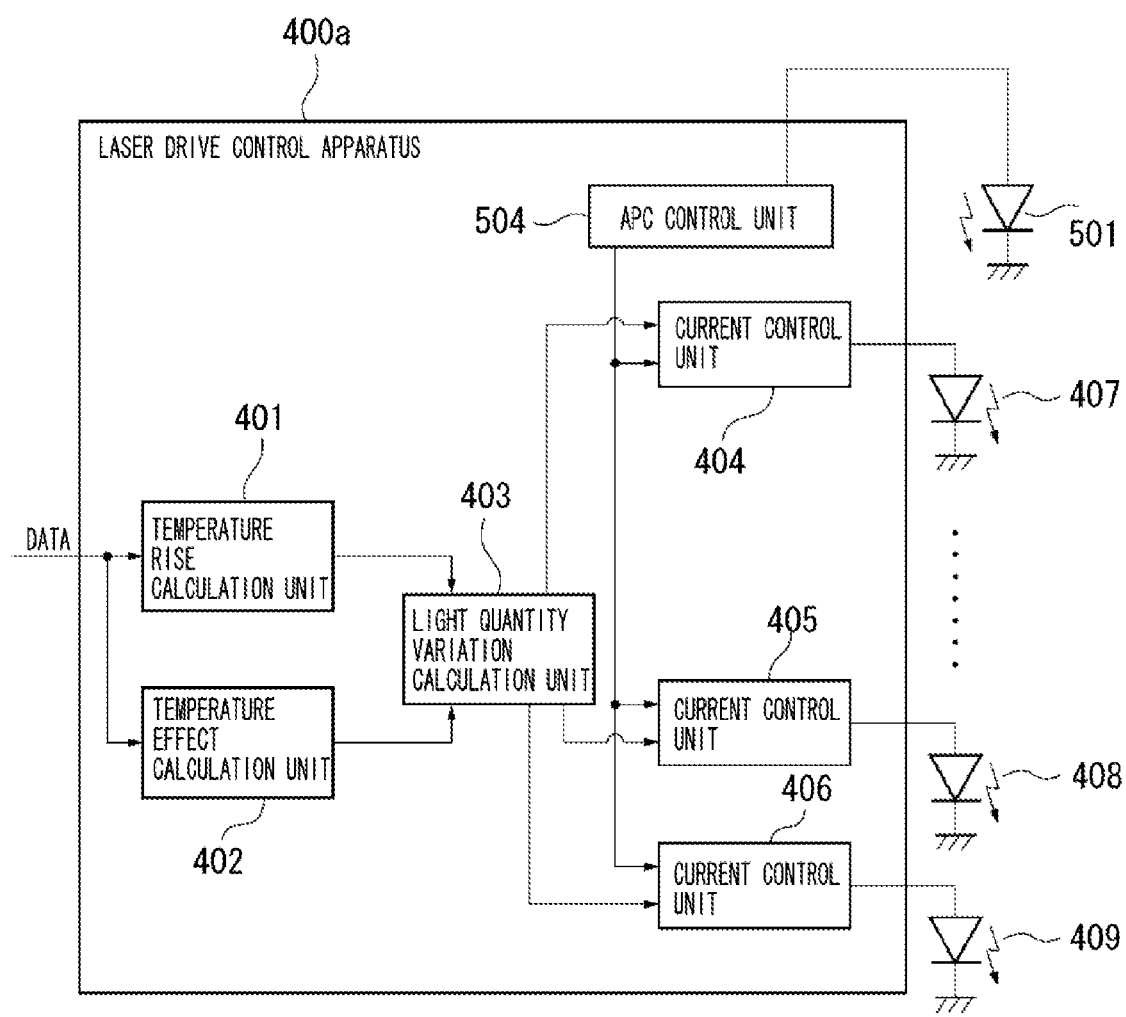
FIG. 9 is a block diagram illustrating an example arrangement of a laser drive control apparatus according to the second exemplary embodiment.

FIG. 9 is a block diagram illustrating an exemplary arrangement of a laser drive control apparatus 400a according to the second exemplary embodiment. The laser drive control apparatus 400a is similar to the laser drive control apparatus 400 of the first exemplary embodiment illustrated in FIG. 6, although the laser drive control apparatus 400a includes an APC control unit 504 according to the second exemplary embodiment.

The laser drive control apparatus 400a performs the following operation which is not described in the first exemplary embodiment. First, in a period that precedes the writing of one scanning line (e.g., beam detection (BD) period), the laser drive control apparatus 400a drives a current control unit of a specific laser diode to supply drive current to this laser diode. The light quantity sensor 501 detects the quantity of light emitted from the specific laser diode. The APC control unit 504 receives the detection value from the light quantity sensor 501.

The APC control unit 504 performs an auto power control (APC) for the current control unit corresponding to the above-described specific laser diode so that a light emission quantity detected by the light quantity sensor 501 becomes a predetermined amount.

The ROM stores data representing differences between a drive current amount for the specific laser diode with which the light emission quantity detected by the light quantity sensor 501 becomes the above-described predetermined amount and a drive current amount for each laser diode of the surface-emitting laser 503 other than the above-described specific laser diode with which the light emission quantity detected by the light quantity sensor 501 becomes the above-described predetermined amount.

When the light emission quantity of the specific laser diode detected by the light quantity sensor 501 becomes the predetermined amount, the laser drive control apparatus 400a calculates a drive current amount supplied to each laser diode other than the specific laser diode based on the drive current amount supplied to the specific laser diode and each difference data stored in the ROM.

The APC control unit 504 outputs each drive current being calculated in the above-described manner to a corresponding current control unit. With the above-described control, the present embodiment can control each laser diode other than the specific laser diode so as to emit laser beam having the above-described predetermined light emission quantity without performing the APC for each of the laser diodes other than the specific laser.

Then, similar to the first exemplary embodiment, the temperature rise calculation unit 401, the temperature effect calculation unit 402, and the light quantity variation calculation unit 403 perform the processing for controlling the light emission quantity of respective laser diodes 407 through 409 to be a constant value during an on-period.

FIGS. 10A through 10D illustrate exemplary light emission from a target laser diode of the surface-emitting laser 503 which is activated by the laser drive control apparatus 400a according to the second exemplary embodiment.

Figure 10A:
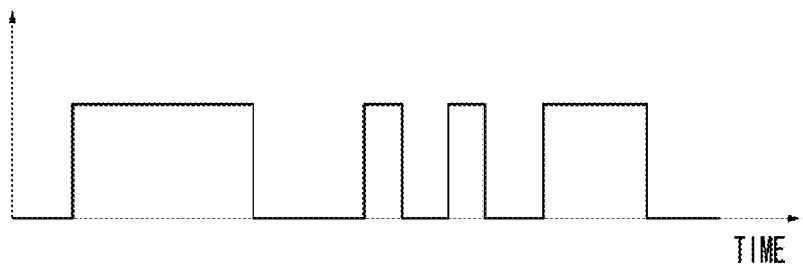
FIGS. 10A through 10D illustrate exemplary light emission from a target laser diode of a surface-emitting laser which is activated by the laser drive control apparatus according to the second exemplary embodiment.
Figure 10B:
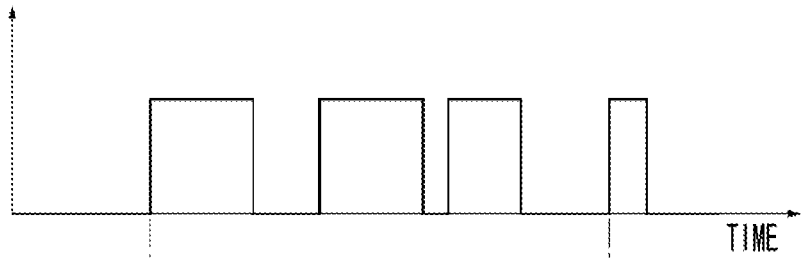
Figure 10C:
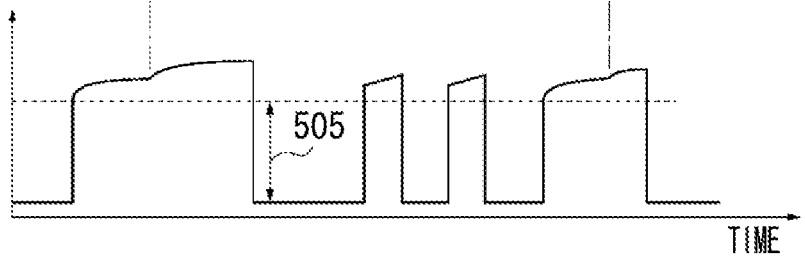
Figure 10D:
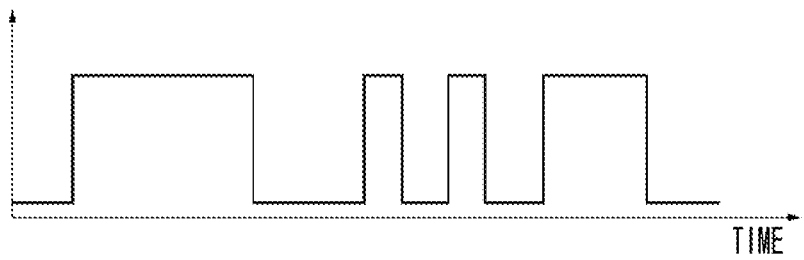

FIG. 11A illustrates image data being set for light emission from the target laser diode, which is similar to the image data illustrated in FIG. 7A. FIG. 10B illustrates image data being set for light emission from a neighboring laser diode of the target laser diode, which is similar to the image data illustrated in FIG. 7B. FIG. 10C illustrates drive current flowing across the target laser diode, which is similar to the drive current illustrated in FIG. 7C. FIG. 11D illustrates the quantity of light emitted from the target laser diode, which is similar to the light emission quantity illustrated in FIG. 7D.

The second exemplary embodiment, as illustrated in FIG. 10C, obtains a drive current amount 505 based on the drive current amount of the specific laser diode with which the light emission quantity detected by the light quantity sensor 501 becomes the above-described predetermined amount, and uses the calculated drive current amount 505 to control other laser diodes.

Thus, the second exemplary embodiment can control the light emission quantity of each laser diode other than the specific laser diode to be the above-described predetermined amount without performing the APC for each of other laser diodes.

Therefore, the second exemplary embodiment can determine a fundamental drive current amount supplied to all laser diodes within a relatively short period of time compared to the case where the APC is performed for all laser diodes.

As described above, the second exemplary embodiment can flexibly correct any change in the light quantity when each light-emitting element of the surface-emitting laser is subjected to temperature effects (including self temperature rise) while adjusting the light quantity during a scanning operation. Thus, the present embodiment can realize a stable real-time light quantity control.

Other Exemplary Embodiments

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer with a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-re-writable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-161622 filed Jun. 9, 2006, which is hereby incorporated by reference herein in its entirety.

What is claimed is:

1. An optical scanning apparatus comprising:
a plurality of light sources configured to emit light based on image data;
a detection unit configured to detect a light quantity of the light emitted from the plurality of light sources; and
a control unit configured to control drive current for driving each of the plurality of light sources,
wherein the control unit is configured to calculate a self temperature rise of each of the light sources based on image data, calculate a temperature effect that the self temperature rise of each of the light sources gives to adjacent light sources based on the image data, calculate a light quantity attenuation of each of the light sources in a time sequential manner based on the self temperature rise and the temperature effect, and control the drive current for driving each of the light sources based on the light quantity attenuation.

2. The optical scanning apparatus according to claim 1, wherein the control unit includes:
a self temperature rise determination unit configured to determine a self temperature rise based on the image data; and
a temperature effect determination unit configured to determine a temperature effect based on the image data for turning on another light source,
wherein the control unit is configured to calculate the light quantity attenuation of each of the light sources in a time sequential manner based on the self temperature rise and the temperature effect.

3. The optical scanning apparatus according to claim 2, wherein the control unit further includes:
a determination unit configured to calculate a light quantity attenuation in the light source, based on the light quantity attenuation in the time sequential manner,
wherein the control unit is configured to control the drive current so that a light emission quantity of the light source becomes constant during a turn-on period, based on the light quantity attenuation.

* * * * *